United States Patent Office 2,883,503
Patented Apr. 21, 1959

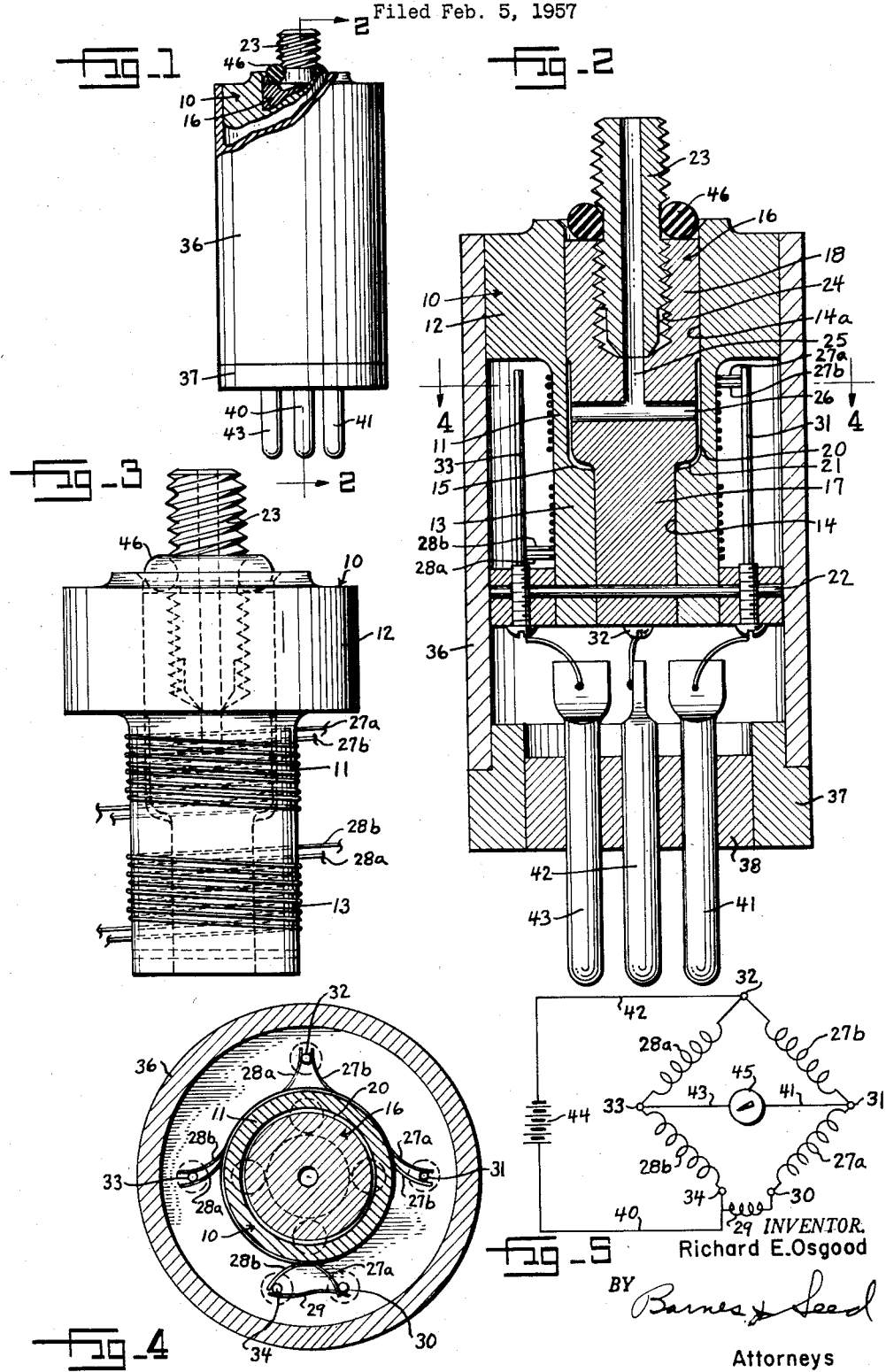

2,883,503

ELECTRIC PRESSURE PICKUP

Richard E. Osgood, Edmonds, Wash.

Application February 5, 1957, Serial No. 638,319

9 Claims. (Cl. 201—63)

This invention relates to pressure pickups of the general type in which high-resistance strain-responsive wire elements are mounted on pressure diaphragms to vary the resistance, and hence the current, in an electrical recording circuit in response to deformations of the diaphragm caused by test differential pressures to which it is subjected.

It has been determined that frequency response measurement has not been limited much in the past by pickup response but rather by oil compliance and inertia effects in the passage leading to and actuating the diaphragm of the pressure pickup. These effects have made it extremely difficult, if not impossible, to accurately test high response electro-hydraulic servo valves, and the present invention has as its principal object the providing of an improved pressure pickup which will so minimize these effects that high response servos can be tested accurately thereby with ease. In carrying out this object the invention aims to provide a low volume pressure pickup, that is to say, a pickup which has a very low fluid displacement including tubing connections so that it can be attached to a servo system with a negligible addition of fluid.

The invention also aims to provide such a pressure pickup which is not sensitive to high vibration or noise environments and in which the pressure measurements are compensated for thermal variations.

As still another object the invention aims to provide a low volume pressure pickup which is particularly small and compact, free of moving parts, light weight, and relatively economical to produce.

Other more particular objects and advantages will, together with these general objects, appear and be understood in the course of the following description and claims, the invention consisting in the novel construction and in the adaptation and combination of parts hereinafter described and claimed.

In the accompanying drawings:

Figure 1 is a side elevational view of the invention partly in section.

Fig. 2 is a longitudinal sectional view taken to an enlarged scale along the line 2—2 of Fig. 1.

Fig. 3 is a side elevational view of the pressure responsive part of the invention.

Fig. 4 is a transverse vertical sectional view taken as indicated by the line 4—4 of Fig. 2, and Fig. 5 is a wiring circuit used with the invention.

Referring to the drawings it is seen that the diaphragm of the pickup is provided by a shell member 10 as a center cylindrical section 11 thereof. Adjoining this diaphragm section 11 toward the foot of member 10 is an externally enlarged base section 12, while its head end joins a compensating section 13 of like outside diameter. A bore 14 extends through the compensating section and is enlarged as a counterbore 14a at a shoulder 15 to give a thinner wall for the diaphragm section. The counterbore 14a continues through the base section 12 to the foot of the shell member 10.

Fitting snugly into the base and compensating sections 12, 13 by neck and primary sections 17, 18, respectively, is a stepped plug 16. The primary section is relieved opposite the diaphragm section 11 to provide a low volume pressure chamber 20 between the plug and the diaphragm. Shoulder 21 between the relieved portion of the primary section and the neck section 17 may be spaced slightly from the shell shoulder 15 as shown or may directly abut the latter. The plug 16 is held in position by a pin 22 passing through the compensating section 13.

A nipple 23 is threaded into a tapped bore 24 provided in the base of the primary section 18. Continuing as an extension of the bore of the nipple is a longitudinal passage 25 in the plug which has a cross-passage 26 at its head end for communicating with the pressure chamber 20.

The plug 16 and the shell member 10 should be formed from the same material so as to have the same expansion coefficient and equal thermal conductivity. This material may be a suitable aluminum alloy which can be anodized to produce in the case of the member 10 a hard surface having good electrical insulating properties so that pairs of wire elements 27a–b, 28a–b can be tension wound directly onto the diaphragm and compensating sections 11, 13, respectively. It will be understood that other materials than aluminum alloy can be used and that the surface upon which the wire elements are to be tension wound can be treated other than by anodizing to obtain suitable hardness and electrical insulation, as for example, by the use of a ceramic coating. The wire elements 27, 28 are of high-resistance strain gage wire having, for example, a .001 inch diameter and a resistance of 871.2 ohms per foot. A thin plastic coating may be sprayed on the windings to assure electrical separation of the turns. The nipple 23 is desirably steel for strength purposes and is preferably a separate member as shown rather than being formed alternatively as an integral prolongation of the plug 16, particularly when the plug is fabricated from a weaker material than steel. Having the nipple 23 as a separate part perforce makes the replacement problem much easier should a nipple failure occur. In this regard it must be appreciated that the nipple in operating units of this invention have had an outside diameter and length as small as .16 and .33 inch, respectively. This gives an idea of how small my entire pressure pickup unit can be constructed and how it makes it possible for me to have an over-all fluid displacement in my pressure pickup of less than .03 cc. including the nipple.

The wire elements 27a–b, 28a–b are electrically connected together in a Wheatstone bridge circuit as shown in Fig. 5. For this purpose terminal posts 30–34 are provided by a ring 35 of an electrically insulated material such as Bakelite, the ring being sleeved on the head end of the compensating section 13. The ring is held in position on the latter by the pin 22 which passes through the compensating section and serves to anchor the plug 16. In the illustrated embodiment the foot ends of tensioned elements 27a–b have been weld connected to terminal 31 while their head ends have been connected to terminals 30 and 32, respectively. Also connected to terminal 32 is the foot end of element 28a, the head end of the latter along with the head end of element 28b being connected to terminal 33. Element 28b has its foot end connected to terminal 34. It is essential before loading that the bridge be balanced, i.e. the resistances of elements 27a–b be the same as the combined resistances of elements 28a–b. For this purpose the required length of strain gauge wire to balance the circuit can be applied as a jumper 29 between terminals 30, 34.

The wire elements and terminals are protected by a cylindrical housing 36 which fits over the base section 12 and ring 35 and projects forwardly beyond the latter to receive the stepped seat 37 of a plug unit. This seat has a ceramic core 38 through which extend four plug prongs or terminals, denoted 40–43. The foot ends of prongs 41–43 are electrically connected by suitable soldered leads to the head ends of the terminal posts 31–33, respectively. Similarly, prong 40 is connected to either post 30 or 34, depending upon which half of the Wheatstone bridge required the jumper 29 for balance. The socket (not shown) for the plug is so wired that prongs 40, 42 will be connected with a battery 44 and prongs 41, 43 to an oscillograph or any other suitable indicating or recording device 45.

My pressure pickup is mounted directly by its nipple 23 at the point on the equipment where the pressure is to be measured. An O-ring 46 assures a proper seal at this point of connection. The illustrated construction and manner of winding the elements 27, 28 gives superior sensitivity and output unaffected by thermal and vibrational varitions while the extremely small fluid displacement of my unit assures minimum oil compliance and inertia effects therein.

It is thought that the invention and its advantages will have been clearly understood from the foregoing detailed description of the now-preferred illustrated embodiment. Minor changes in the details of construction can self-evidently be resorted to without departing from the spirit of the invention and it is therefor my intention that no limitations be implied and that the hereto annexed claims be given the broadest interpretation to which the employed language fairly admits.

What I claim is:

1. A low volume pressure pickup comprising an elongated cylinder having a bored compensating section integrally adjoined by a counterbored diaphragm section, a stepped plug of the same material as said cylinder fitting snugly by a reduced neck section into said compensating section and having a longitudinally bored primary section within said diaphragm section and defining with the latter a low volume pressure chamber opening to the longitudinal bore of the primary section for connection to a source of pressure, a pair of high-resistance strain-responsive wire elements tension wound, one on said compensating section and the other on said diaphragm section concentrically to said pressure chamber, and means for electrically insulating the turns of each of said wire elements from one another and from said cylinder.

2. A low volume pressure pickup comprising, a shell member having a cylindrical portion integrally adjoined by an externally enlarged base portion, said cylindrical portion having a bored compensating section integrally adjoined to a counterbored diaphragm section with the counterbore of the latter extending through said base portion, a stepped plug of the same material as said shell member fitting snugly by a reduced neck section into said compensating section and having a longitudinally bored primary section within said counterbore and defining with said diaphragm section a low volume pressure chamber which opens to the longitudinal bore of the primary section for connection to a source of pressure, a pair of high-resistance strain-responsive wire elements tension wound, one on said compensating section and the other on said diaphragm section concentrically to said pressure chamber, and means for electrically insulating the turns of each of said wire elements from one another and from said shell member.

3. A low volume pressure pickup comprising a shell member having a central cylindrical diaphragm section integrally adjoined at its head end by a compensating section of like external diameter and reduced inside diameter as the diaphragm section and integrally adjoined at its foot end by a base section of like inside diameter and enlarged outside dimension as the diaphragm section, a stepped plug of the same material as said shell member fitting snugly by a reduced terminal head section into said compensating section and having a longitudinally bored primary section extending from said head section through said diaphragm section into said base section, said primary section being necked slightly within said diaphragm section to define with the latter a low volume pressure chamber, said primary section having a crossbore interconnecting its longitudinal bore with said pressure chamber, a nipple threaded into the foot of said plug and internally communicating with said longitudinal bore for connection with a source of pressure, a pair of high-resistance strain-responsive wire elements tension wound, one on said compensating section and the other on said diaphragm section concentrically to said pressure chamber, and means for electrically insulating the turns of each of said wire elements from one another and from said shell member.

4. A low volume pressure pickup comprising a shell member having a central cylindrical diaphragm section integrally adjoined at its head end by a compensating section of like external diameter and reduced inside diameter as the diaphragm section and integrally adjoined at its foot end by a base section of like inside diameter and enlarged outside dimension as the diaphragm section, a stepped plug of the same material as said shell member fitting snugly by a reduced terminal head section into said compensating section and having a longitudinally bored primary section extending from said head section through said diaphragm section into said base section, said primary section defining a low volume pressure chamber with said diaphragm section and having its longitudinal bore intercommunicating with said pressure chamber, a pair of high-resistance strain-responsive wire elements tension wound, one on said compensating section and the other on said diaphragm section concentrically to said pressure chamber, and means for electrically insulating the turns of each of said wire elements from one another and from said shell member.

5. A low volume pressure pickup comprising a shell member having a central cylindrical diaphragm section integrally adjoined at its head end by a compensating section of like external diameter and reduced inside diameter as the diaphragm section and integrally adjoined at its foot end by a base section of like inside diameter and enlarged outside diameter as the diaphragm section, an electrically insulated collar fitted on the head of said compensating section and having the same outside diameter as said base section, terminals extending through said collar, a housing sleeved on said base section and collar, a stepped plug of the same material as said shell member fitting snugly by a reduced terminal head section and having a longitudinally bored primary section extending from said head section through said diaphragm section into said base section, said primary section defining a low volume pressure chamber with said diaphragm section and having its longitudinal bore intercommunicating with said pressure chamber, a pair of high-resistance strain-responsive wire elements operatively connected to said terminals and tension wound, one on said compensating section and the other on said diaphragm section concentrically to said pressure chamber, and means for electrically insulating the turns of each of said wire elements from one another and from said shell member.

6. A low volume pressure pickup comprising a shell member having a central cylindrical diaphragm section integrally adjoined at its head end by a compensating section of like external diameter and reduced inside diameter as the diaphragm section and integrally adjoined at its foot end by a base section of like inside diameter and enlarged outside diameter as the diaphragm section, an electrically insulated collar fitted on the head of said compensating section and having the same outside diameter as said base section, terminals extending through said collar, a housing sleeved on said base section and collar and extending by its head end longitudinally beyond the latter, an electrical plug assembly seated in the head end of said housing and operatively connected to said terminals, a stepped plug of the same material as said shell member fitting snugly by a reduced terminal head section and having a longitudinally bored primary section extending from said head section through said diaphragm section into said base section, said primary section defining a low volume pressure chamber with said diaphragm section and having its longitudinal bore intercommunicating with said pressure chamber, a pair of high-resistance strain-responsive wire elements operatively connected to said terminals and tension wound, one on said compensating section and the other on said diaphragm section concentrically to said pressure chamber, and means for electrically insulating the turns of each of said wire elements from one another and from said shell member.

7. A low volume pressure pickup comprising a shell member having a central cylindrical diaphragm section integrally adjoined at its head end by a compensating section of like external diameter and reduced inside diameter as the diaphragm section and integrally adjoined at its foot end by a base section of like inside diameter and enlarged outside diameter as the diaphragm section, an electrically insulated collar fitted on the head of said compensating section and having the same outside diameter as said base section, terminals extending through said collar, a housing sleeved on said base section and collar and extending by its head end longitudinally beyond the latter, an electrical plug assembly seated in the head end of said housing and operatively connected to said terminals, a stepped plug of the same material as said shell member fitting snugly by a reduced terminal head section into said compensating section and having a longitudinally bored primary section extending from said head section through said diaphragm section into said base section, said primary section being necked slightly within said diaphragm section to define with the latter a low volume pressure chamber, said primary section having a cross-bore interconnecting its longitudinal bore with said pressure chamber, a nipple threaded into the foot of said plug and internally communicating with said longitudinal bore for connection with a source of pressure, a pair of high-resistance strain-responsive wire elements operatively connected to said terminals and tension wound, one on said compensating section and the other on said diaphragm section concentrically to said pressure chamber, and means for electrically insulating the turns of each of said wire elements from one another and from said shell member.

8. In a pressure pickup, a hollow diaphragm section sensitive to variations in fluid pressure therein, a compensating section integrally joining said diaphragm section and non-responsive to pressure changes in the latter, a first pair of high-resistance strain-responsive wire elements spirally tension wound in spaced bi-filar relation on said compensating section, a second pair of high-resistance strain-responsive wire elements similarly wound on said diaphragm section, and means for electrically insulating the turns of said wire elements from one another and from their respective said sections.

9. The pressure pickup of claim 8 in which said diaphragm section has a plug fitting therein and together with the diaphragm section defining a low volume pressure chamber, said plug having a passage therethrough communicating with said chamber for introducing fluid thereto for introducing fluid to said chamber.

References Cited in the file of this patent
UNITED STATES PATENTS

| | | |
|---|---|---|
| 2,398,372 | Green | Apr. 16, 1946 |
| 2,420,148 | Ostergren | May 6, 1947 |
| 2,421,907 | Postlewaite | June 10, 1947 |
| 2,455,883 | Statham | Dec. 7, 1948 |
| 2,663,781 | Rundell | Dec. 22, 1953 |